Nov. 20, 1928.   E. C. WAMELINK   1,692,477
DETACHABLE CONNECTION
Filed May 25, 1923   2 Sheets-Sheet 2
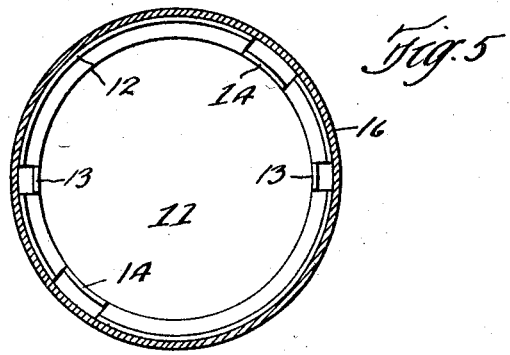
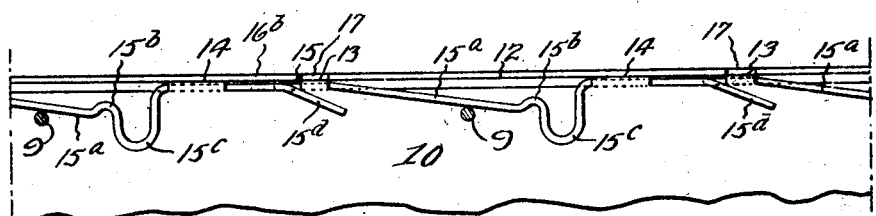
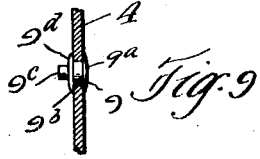
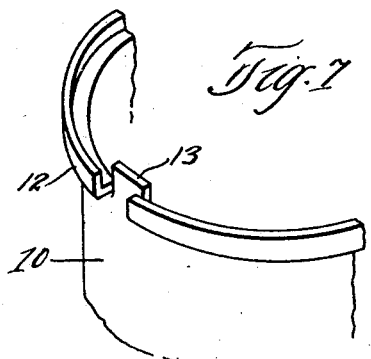
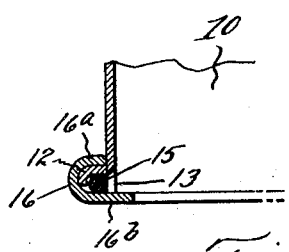

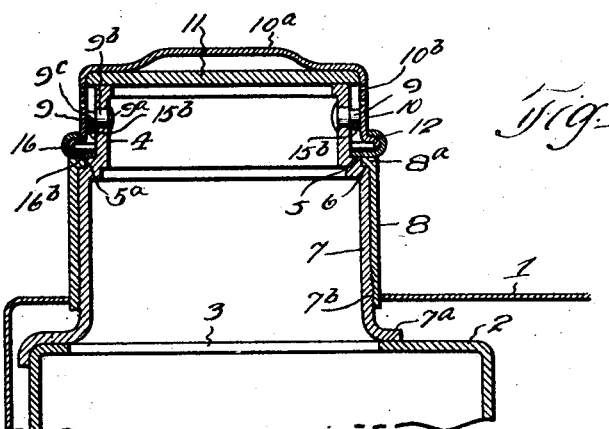

Patented Nov. 20, 1928.

1,692,477

UNITED STATES PATENT OFFICE.

EUGENE C. WAMELINK, OF CLEVELAND HEIGHTS, OHIO, ASSIGNOR, BY MESNE ASSIGNMENTS, TO THE EATON AXLE & SPRING COMPANY, OF CLEVELAND, OHIO, A CORPORATION OF OHIO.

DETACHABLE CONNECTION.

Application filed May 25, 1923. Serial No. 641,312

This invention relates to detachable connections, and more especially to connections employed for securing together two telescopically fitting members. The general object of the invention is to provide a connection of this type which is simple and inexpensive of production but which is particularly efficient in operation in enabling the parts to which it is applied, not only to be conveniently and effectively connected, but to maintain such connection notwithstanding excessive vibrations or other incidents of use tending to disengage the said parts.

A further and more limited object of the invention is to provide a connection of this character which is particularly adapted for embodiment in installations such as the cap and filling connection of an automobile radiator, or like installations which are subjected to heat. Still further objects of the invention will appear hereinafter and will be secured in and through the combinations and arrangements of parts illustrated in the drawings hereof and set forth in the claims hereto annexed.

Referring to the aforesaid drawings, Fig. 1 represents a central sectional view through a radiator connection, showing my invention applied to the cap thereof; Fig. 2 a plan view of the radiator connection shown in Fig. 1; Fig. 3 a bottom plan view of the cap; Fig. 4 a sectional detail of the cap, the section being taken immediately inside of the bottom flange thereof; Fig. 5 is a view similar to Fig. 4, but with the locking wires removed; Fig. 6 is a development of the inner portion of the cap, showing the manner in which the locking wire is anchored in place; Fig. 7 a detail in perspective of the wire-receiving portion of the cap, the locking wire being removed; Fig. 8 an enlarged sectional detail of the cap showing the locking wire in place; and Fig. 9 a detail in section showing one of the studs or pins.

Describing the various parts herein by reference characters, 1 denotes the top of the hood of an automobile and 2 the top of the radiator located therewithin. The radiator is provided with a filling opening 3 to which the filling neck or connection is applied. As shown herein, this filling neck comprises an upper cylindrical section 4 connected by an outwardly extending step 5, 5ª and a shoulder 6 with a lower cylindrical portion 7 which is provided at its bottom or inner end with a flange 7ª by means of which the neck connection may be secured to the radiator in register with the opening 3.

Within the top of the hood 1, the cylindrical portion 7 is provided with an external thread 7ᵇ which is adapted to receive a corresponding thread on the bottom of a surrounding sleeve 8 having at its top an inwardly directed flange 8ª adapted to engage with its bottom the top of the flange or shoulder 6, its upper edge or wall being flush with the top 5 of the step and its inner edge engaging the intermediate cylindrical surface 5ª. The sleeve 8 forms with the top 5 of the step a seat for the lower end of a radiator cap while the outer surface of the said sleeve provides an ornamental finish for the portion 7 of the filling connection or neck which projects beyond the hood 1. The upper or outer portion 4 of the filling connection is provided with a pair of pins or studs 9, preferably located diametrically opposite each other.

Cooperating with the parts 4, 5 and 8ª, and with the studs or pins 9 is a cap. This cap comprises a cylindrical body or skirt 10 having at its bottom or inner end a flange which is adapted to engage the seat formed by the parts 5 and 8ª and having within the cover 10ª thereof a gasket 11, which is adapted to be forced against the outer end of the neck when the flange is thus seated. The construction by means of which the cap is applied to the pins or studs 9 and drawn thereby to its seat will now be described.

The lower or inner end of the cylindrical body or skirt 10 of the cap is provided with an outwardly and downwardly projecting flange 12, the said flange forming, with a cooperating part, seating means for a pair of wires which constitute a double resilient thread by means of which the cap is detachably connected to the part 4 through the studs or pins 9. At diametrically opposite points, the flange 12 is cut through and the resilient tongues thus formed are bent downwardly in substantially alignment with the wall 10, two such tongues being indicated at 13 in Fig. 5 and one such tongue being indicated in Fig. 7. Also located diametrically opposite each other and shown as approximately 60° from the tongues 13 are the lips or tongues 14, the last mentioned tongues being shown as of greater width or angular extent than the parts 13. These tongues cooperate with a base member for the cap to form seats for the end portions of the wires constituting the double resilient thread referred to hereinbefore. These wires are shown in Figs. 4 and 6 and each comprises an end portion 15 which is adapted to be received outside of a lip or tongue 13, an inclined portion $15^a$ extending upwardly (or toward the cover of the cap) from such seat, the inclined portion $15^a$ constituting an operating resilient thread in each of said wires, the inclined or thread portion terminating in a concave seat $15^b$ formed by bending each wire downwardly or toward the flange 12 of the cap or closure. From the seat $15^b$, each wire is bent upwardly or toward the cover of the cap, thence downwardly or toward the flange 12, forming a loop $15^c$, thence behind a tongue 14, whence it is extended along the groove formed by and within the flange 12, and the extreme end is bent upwardly toward the cover in an inclined direction, as indicated at $15^d$. The inclined end $15^d$ of each of the wires is so bent upwardly or toward the cover on the opposite side from a tongue 13 from which the inclined portion $15^a$ of the complementary wire extends. The portion $15^a$ of one wire and the portion $15^d$ of the other wire form therebetween an inclined channel which assists in the removal of the cap, as will be pointed out hereinafter.

With the wires positioned within the flange 12 and within the body 10 and engaging the projections or tongues 13 and 14 as described, the end portions will be preferably locked in place against such projections by means of an annular base, indicated generally at 16, the said base being of approximately U-shape in section and having its upper or outer flange $16^a$ engaging the corresponding outwardly projecting portion of the flange 12, while its inner or bottom flange $16^b$ engages the tongues 13 and 14 and extends radially inwardly beyond the same. The locking base may be secured in place by spinning the metal thereof about the flange 12, about the portions of the wires 15 within such flange, and about the tongues 13 and 14. This construction anchors the end portions of the wires securely in place and provides an ornamental finish for the cap. In line with the tongues 13, the flange $16^b$ is notched, as indicated at 17, for the reception of the pins or studs 9. With the parts constructed and arranged as described, the cap will be applied to the radiator neck by aligning the notches 17 with the studs or pins 9 and by pressing downwardly upon the cap and then rotating it from left to right in the direction of the ordinary screw thread. This will cause the pins 9 to follow in the channels provided between the parts $15^a$ and $15^d$ and to engage above the inclined parts $15^a$. These parts, forming the double resilient thread, will, by the time the lower or inner portions of the parts $15^a$ shall have reached the studs 9, have drawn the cap firmly to its seat, with the gasket 11 engaging the outer end of the part 4 and the flange $16^b$ engaging the parts 5 and $8^a$, at which time the studs or pins will snap into the seats $15^b$ and further movement in a locking direction will be resisted by the parts $15^c$. When it is desired to remove the cap, it is only necessary to turn it firmly in the opposite direction. This will result in disengaging the pins or studs from the seats $15^b$. As the cap is rotated to the left, the portions of the wires $15^d$ will pass above the studs or pins 9 and, in cooperation with the notches, will facilitate the unseating of the cap.

As the cap herein shown and described is intended for use with a radiator, it is desirable that it be not heated to a temperature which will prevent it from being operated by hand. To prevent it from becoming so overheated, it is provided with openings $10^b$ formed in the skirt or cylindrical portion 10, said openings permitting circulation of air through the cap. This circulation of air will largely prevent the overheating of the cap referred to and enable it to be handled by the operator.

While the parts 9 have been referred to as "pins or studs", it will be evident that any projections suitable to engage the resilient threads $15^a$ will secure the same result as such pins or studs. Hence, by the use of the expression "pins or studs" I do not propose to be limited to any particular style of projections, provided that they are capable of cooperating with the said threads to draw the cap to its seat. Furthermore, while I have shown and described wires as employed for the resilient locking members, I do not propose thereby to limit myself to the use of any particular cross-section in the material employed for such threads.

For the purpose of securing a cheap and efficient mounting of the pins or studs on the filling neck, each pin or stud is constructed in the manner shown more particularly in Fig. 9. As will be seen from this view, each pin or stud comprises a head $9^a$ adapted to engage the inner surface of the neck, a body portion $9^b$ adapted to fit within the opening provided therefor in such neck, and a reduced thread-engaging portion $9^c$. The body portion $9^b$ is of slightly greater length than the thickness of the stock of the neck, thereby enabling the annular portion $9^d$ to be peened outwardly into engagement with the outer face of the neck. This provides a cheap and efficient manner of mounting the pins or studs on such neck.

Having thus described my invention, what I claim is:

1. The combination, with a member having a plurality of pins or studs projecting therefrom, of a second member adapted to form a telescoping connection with the first mentioned member and having at such telescoping end a channeled seat, said seat having a pair of tongues struck therefrom corresponding to each pin or stud, and a resilient wire for each pin or stud, each wire having an end anchored behind one of the tongues of each pair of tongues, an inclined portion extending from such anchoring tongue, and a second end extending from the opposite end of its inclined portion and located behind and anchored by the other tongue of such pair of tongues.

2. The combination, with a member having pins or studs projecting therefrom, of a second member having a skirt adapted to form a telescoping connection with the first-mentioned member and having adjacent one end thereof tongues in substantial alignment with the body thereof, wires each having an end extending outside of and anchored by a tongue and each having an inclined portion extending away from such end of the second member and within the wall thereof and each having a seat for a pin or stud at the end of such inclined portion, each wire also having a portion extending from such seat toward the aforesaid end of the second member, means adjacent such operating end of the second member for locking the second end portions of each of said wires, the extreme end of one wire being inclined away from such end of the member adjacent to the tongue or projection by which the opposite end of the adjacent wire is anchored, whereby an inclined path is formed between the inclined portion of one wire and the inclined operating portion of the other wire for the reception of a pin or stud.

3. The combination, with a member having pins or studs projecting therefrom, of a second member having a skirt adapted to form a telescoping connection with the first mentioned member and having at one end thereof an outwardly projecting recess, tongues within said recess, resilient locking members each having an end extending outside of and anchored by a tongue and each having an inclined portion extending away from such end of the second member and within the wall thereof and each having a seat for a pin or stud at the end of such inclined portion, each locking member also having a portion extending from such seat toward the aforesaid end of the second member and anchored within said recess by another tongue.

4. The combination, with a member having pins or studs projecting therefrom, of a second member having a body adapted to telescope over the first member and having at its inner or operating end a radially outwardly projecting channeled seat, anchoring projections in said seat, resilient locking members each having an end secured in said seat outside of a projection, and each having an operating inclined portion extending away from such projection and within the inner wall of the second member and having at the end of such inclined portion which is remote from said seat a stop for a pin or stud, each locking member being bent inwardly from such stop toward the seat and each extending behind another projection within such seat and from such other projection away from such seat in an inclined direction and forming with the opposite inclined portion of another locking member a passageway for the reception of a pin or stud, the seat being recessed or notched at the outer or receiving end of such passageway for the reception of a pin or stud.

5. A cap adapted to telescope with a coöperating member, said cap having adjacent the open end thereof an outwardly projecting annular seat, the bottom of said seat being provided with notches, resilient locking members each having an end anchored in said seat and extending in an inclined direction within said body from one side of such seat to form a resilient thread, the opposite end portion of each locking member being bent toward and secured to and within said seat and the extreme end of each locking member extending from its second locking point in an inclined direction and located on the opposite side of a notch from the inclined portion of an adjacent locking member.

6. A cap of the character described comprising a body having at its bottom or inner end an outwardly extending flange provided with pairs of tongues struck from said flange and extending in line with the cylindrical body thereof, a substantially U-shaped flange secured to the first mentioned flange and having its inner edge or bottom projecting radially inwardly in substantial alignment with the cylindrical body and forming a channel with the former flange, a pair of resilient locking members each having one end anchored behind a tongue within such channel and each having its opposite end portion anchored behind another tongue and within such channel, each locking member having intermediate of its anchoring tongues an inclined portion constituting a resilient thread and each having a final inclined end portion extending from its second anchoring tongue and forming with the first inclined portion of the adjacent locking member an inclined channel or guide for the reception of a pin or stud, the bottom of the second flange or U-shaped member being cut away to permit the entrance of a pin or stud into and out of an inclined channel.

7. The combination, with a cap having one or more locking members, of a hollow body adapted to receive said cap, the said body having one or more pins or studs adapted to engage the locking member or members of said cap, each pin or stud having a head adapted to engage one surface of the said body, a body portion mounted within an aperture provided therefor in said body and extending through the wall thereof, each of said pins or studs having a reduced engaging portion projecting beyond said hollow body, the annular portion between such body portion and such projecting portion being peened against the adjacent surface of said body.

8. A cap of the character described comprising a body having at its bottom or inner end an outwardly extending recess provided with an inwardly extending flange at the bottom or inner end thereof, the said body having pairs of anchoring members in the recessed portion thereof, a plurality of resilient locking members each having one end portion anchored behind a member of one of such pair of anchoring members and its other end portion anchored behind the other member of such pair of anchoring members, each locking member having intermediate of its anchoring members an inclined portion constituting a resilient thread, the bottom flange of the recess being cut away to permit the entrance of pins or studs to cooperate with the resilient locking members.

9. A cap of the character described comprising a body having at its bottom or inner end an outwardly extending recess provided with an inwardly extending flange at the bottom or inner end thereof, the said body having pairs of tongues struck therefrom and forming anchors with the outer wall of the recess, a plurality of resilient locking members each having one end portion anchored behind a tongue of one of such pair of tongues and its other end portion anchored behind the other tongue of such pair of tongues, each locking member having intermediate of its anchoring tongues an inclined portion constituting a resilient thread, the bottom flange of the recess being cut away adjacent to one of the tongues of each pair of tongues to permit the entrance of pins or studs to cooperate with the resilient locking members.

10. A cap of the character described comprising a body having at its bottom or inner end an outwardly extending recess provided with an inwardly extending flange at the bottom or inner end thereof, the said body having pairs of anchoring members in the recessed portion thereof, a plurality of resilient locking members each having one end portion anchored behind a member of one of such pair of anchoring members and its other end portion anchored behind the other member of such pair of anchoring members, each locking member having intermediate of its anchoring members an inclined portion constituting a resilient thread and each having its second end portion extending beyond such second anchoring member in proximity to an anchoring member of the next pair of anchoring members and there inclined to provide with the inclined portion of the adjacent resilient member a guideway for a pin or stud, the flange being provided with a notch between such adjacent inclined portions of adjacent locking members for the passage of a pin or stud.

11. In combination, a member having a pair of pins or studs projecting therefrom, a second member adapted for telescoping connection with said first mentioned member and having two pairs of tongues struck therefrom, one pair of tongues for each pin or stud, and a resilient wire for each pin or stud, each wire being anchored by a pair of said tongues and having an inclined intermediate portion arranged between the tongues of said pair and adapted for cooperation with a pin or stud.

12. In combination, a member having a pair of pins or studs projecting therefrom, a second member adapted for telescoping connection with said first mentioned member and having two pairs of anchoring projections lying in substantially the same general transverse plane, one pair of projections for each pin or stud, each wire being anchored by a pair of said projections and having an inclined intermediate portion arranged between the projections of said pair and adapted for cooperation with a pin or stud.

13. In combination, a member having a pair of pins or studs projecting therefrom, a second member adapted for telescoping connection with said first mentioned member and having two pairs of anchoring projections, one pair of projections for each pin or stud with the projections of the two pairs circumferentially arranged, and a resilient wire for each pin or stud, each wire being anchored by a pair of anchoring projections and having an inclined intermediate portion arranged between the projections of said pair and adapted for cooperation with a pin or stud.

14. In combination, a member having a pair of pins or studs projecting therefrom, a second member adapted for telescoping connection with said first mentioned member and having two pairs of anchoring projections, one pair of projections for each pin or stud, and a resilient wire for each pin or stud, each wire being anchored by a pair of said projections and having an inclined intermediate portion arranged between the projections of said pair and adapted for cooperation with a pin or stud, each wire being also provided with an extension arranged adjacent to and parallel with the inclined intermediate portion of the other wire and adapted to form a passageway therebetween for a pin or stud.

In testimony whereof, I hereunto affix my signature.

EUGENE C. WAMELINK.